March 22, 1966  L. TROY  3,241,638
BRAKE SHOE ADJUSTMENT MECHANISM
Filed May 26, 1964  2 Sheets-Sheet 1

INVENTOR
LEONARD TROY
BY Samuel Meerkreebz
ATTORNEY

March 22, 1966 L. TROY 3,241,638
BRAKE SHOE ADJUSTMENT MECHANISM
Filed May 26, 1964 2 Sheets-Sheet 2

INVENTOR
LEONARD TROY
BY Samuel Meerkreebz
ATTORNEY

United States Patent Office 3,241,638
Patented Mar. 22, 1966

3,241,638
BRAKE SHOE ADJUSTMENT MECHANISM
Leonard Troy, 611 N. Webster Ave., Scranton, Pa.
Filed May 26, 1964, Ser. No. 370,155
4 Claims. (Cl. 188—79.5)

This invention relates generally to new and useful improvements in brake constructions, and more particularly to an improved brake shoe adjustment mechanism.

The present invention is particularly adaped for use in a brake construction of the character dislosed in detail in applicant's copending application Serial No. 136,423, filed September 5, 1961, and issued as United States Letters Patent No. 3,135,362 issued on June 2, 1964, however, other applications of the invention will occur to those skilled in the art.

The present invention is particularly adapted to be used with brakes which include independent brake shoes where it is important to adjust, as closely as possible, the brake-to-shoe clearances of the independent shoes. Reference may be had to the copending application for specific details of the independently operated brake shoe mechanism, however, only that portion generally necessary to understand the present invention will be described in detail herein.

Primary objects of the present invention are to provide a novel brake shoe adjustment mechanism for independently operating brake shoes; to provide a brake shoe adjustment mechanism which includes an infinite number of adjustment positions for compensating exactly for the amount of brake shoe or drum wear; to provide an adjustment mechanism for brakes which is readily accessible for adjustment as well as being operable and understandable by relatively inexperienced personnel; to provide an adjustment mechanism which can be readily serviced, replaced and repaired, and which is highly practical and serviceable for the purpose intended.

These together with other and more specific objects and advantages will become apparent from the following description when taken with the accompanying drawing forming a part thereof, wherein:

In the drawing:

FIGURE 4 is an enlarged fragmentary section taken on the plane of line 4—4 of FIGURE 1;

FIGURE 5 is a perspective view of the adjustable wedge element of the invention; and FIGURE 6 is an enlarged exploded perspective view of one of the closure caps for the housing on the brake shoes.

Figure 1:
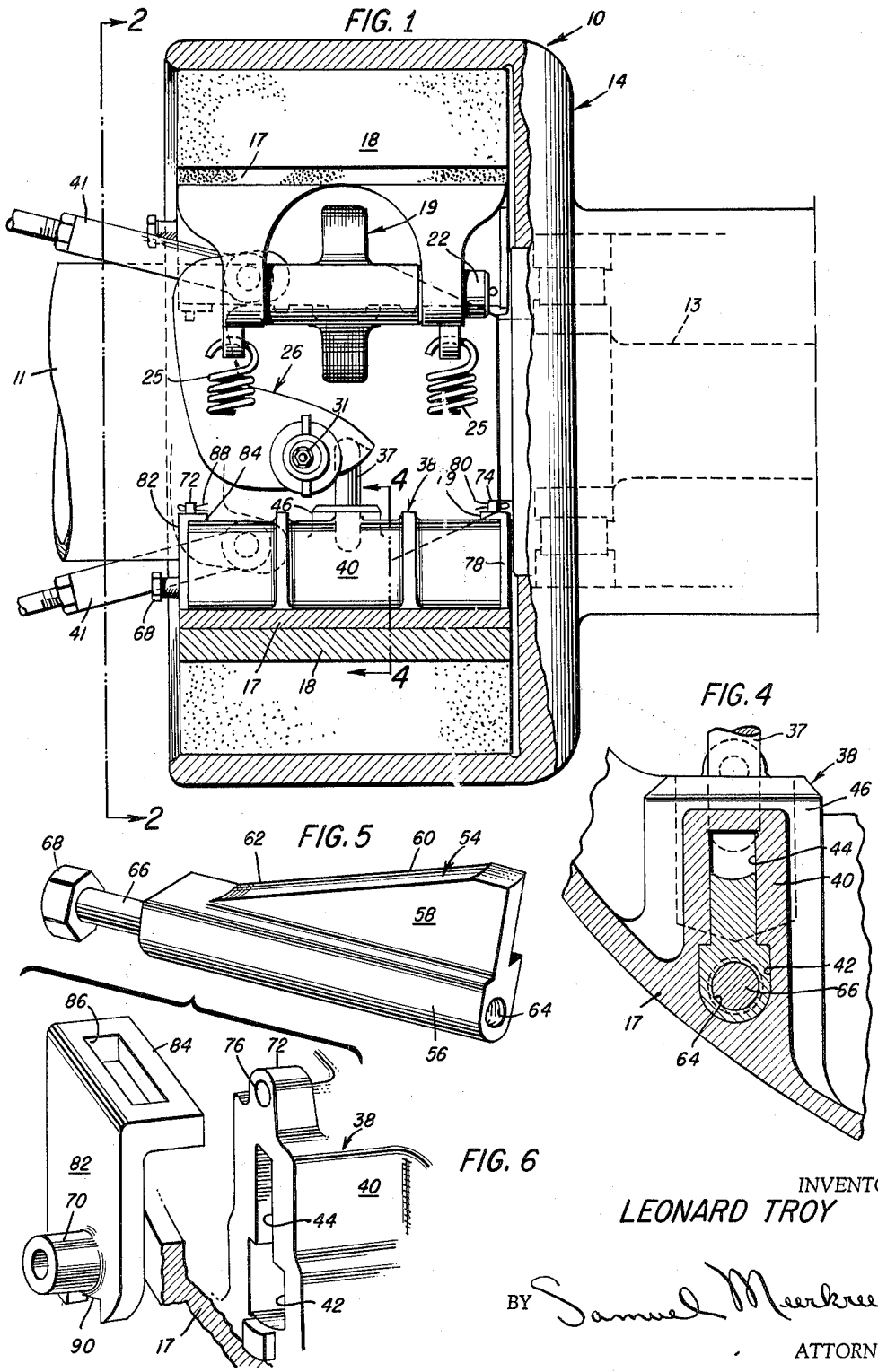
FIGURE 1 is a side elevation of a brake drum-and-shoe assembly, portions being broken away for purposes of clarity.
Figure 2:
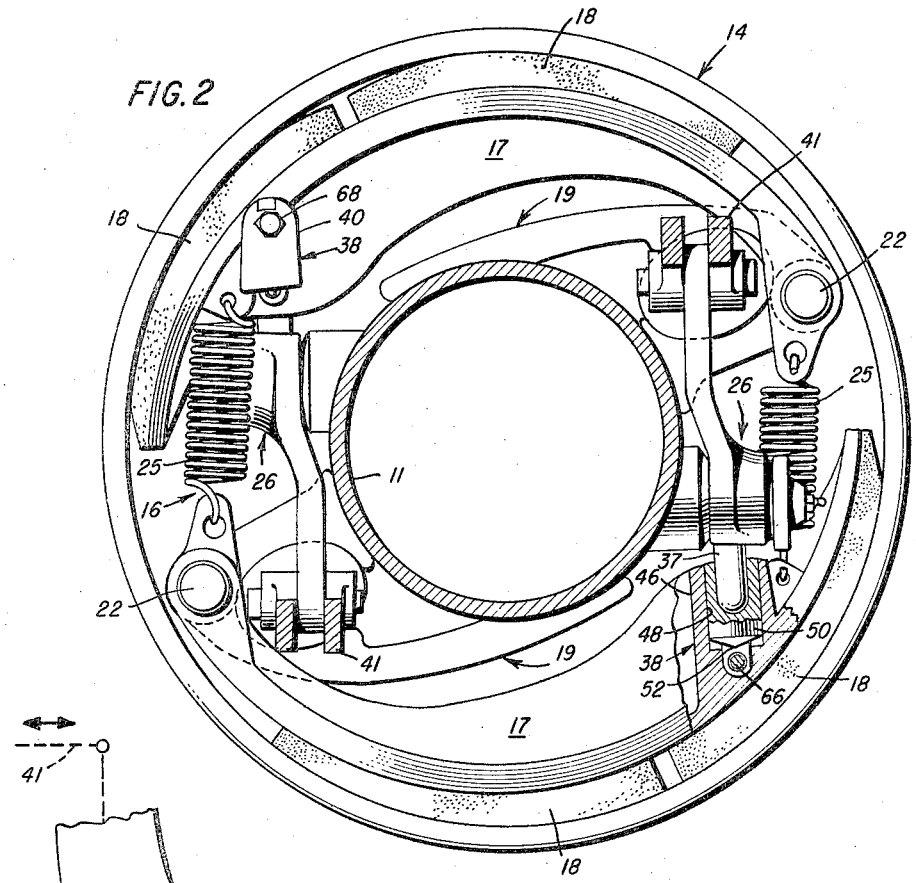
FIGURE 2 is a section looking substantially from the plane of line 2—2 of FIG. 1.

Referring to FIGURES 1 and 2, a vehicle wheel mounting assembly is indicated generally at 10 and includes an axle housing 11 through which a suitable spindle 13 extends. The possible 13 has suitably journaled thereon a brake drum or rotor 14 and upon which a wheel will be mounted in a conventional manner (not shown).

Disposed within the drum or rotor 14 is a brake construction indicated generally at 16. The brake construction 16 includes one or more brake shoes 17, each having a lining 18 secured on the outer surface thereof. The shoes 17 are supported on shoe spiders 19 and are pivotally supported at one end on a pivot pin 22 parallel to the axis of rotation of the axle housing 11. The opposite ends of the shoes include a bracket portion to which one end of a return spring 25 is anchored, the other end of the spring being anchored to a bracket on the pivoted end of the shoes.

Each of the shoes is independently operated by a bellcrank 26 which is pivotally mounted at 31 on a suitable spider. The bellcrank 26 is pivotally connected to an externally projecting link 41 for pivoting the same due to activation of an external operator (not shown) and the bellcrank 26 engages a push rod 37 which will engage in a socket of the adjusting assembly 38 transversely of the shoes 17, as clearly seen in FIGURES 1–4.

Details of the structure other than the assembly 38 are disclosed in applicant's previously mentioned copending application. Only one of the assemblies will be described in detail, and it is readily apparent to those skilled in the art that the invention could be utilized in a brake assembly comprising one shoe or more than the two shoes shown.

The assembly 38 comprises a transversely disposed, open-ended housing 40 which has a through passage; see FIGURE 4, having a "key-shaped" cross-section including a radiused lower portion 42 communicating with a rectangular passage portion 44. Integral with the housing 40 is a tubular, integral sleeve portion 46 which communicates with the passage portion 44. A bearing portion 48 is formed in the sleeve and includes therein a terminally socketed force-transmitting element 50 engaged by the link 37. The element 50 includes a conical terminal end 52 extending toward the passage portion 42. Adjustably and reciprocably received in the passage portions 42 and 44 is an elongated shimming wedge indicated generally at 54 and comprising a base portion 56 conforming to passage portion 42 and integral with a plate portion 58 conforming to passage portion 44. Plate portion 58 has an inclined wedge or cam edge 60 extending substantially the length thereof; the cam edge having a substantially concave cross-sectioned groove 62 extending the length thereof and conforming to and receiving the conical end 52 of element 50 therein.

The base 56 has extending the length thereof an internally threaded bore 64. The bore 64 threadedly receives therein an elongated bolt 66 having a polygonal head 68.

Figure 3:
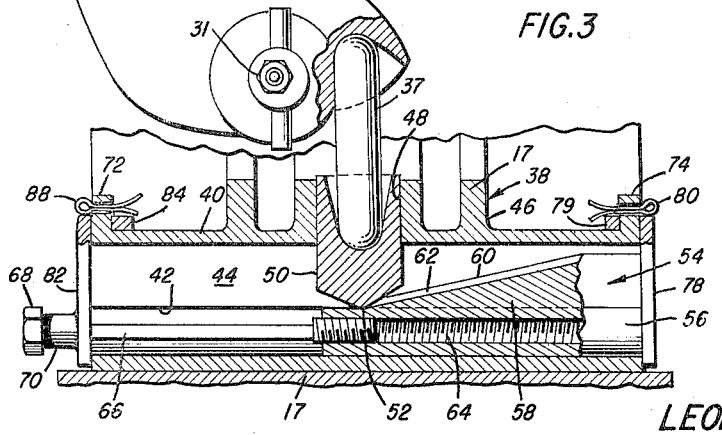
FIGURE 3 is an enlarged fragmentary view of a portion of FIGURE 1, and showing the pertinent portions of the brake shoe adjustment mechanism.

As seen particularly in FIGURES 2, 3 and 6, the housing includes at opposite ends lug portions 72 and 74 which are transversely apertured, as indicated at 76 in FIGURE 6. A closure plate 78 includes a lateral flange 79 which includes a rectangular slot received on lug 74 and retained thereon by a cotter pin or the like as indicated at 80. A similarly conformed closure plate 82 includes a lateral flange 84 which is slotted at 86 for receipt of lug 72; see FIGURE 6. A cotter pin 88 retains the plate 82 over the end of housing 40, and includes a lower notched portion 90 which engages over an abutment integral with housing 40 and disposed below passage portion 42; see FIGURE 6. The plate 82 includes a laterally projecting bearing sleeve which receives the bolt 66 and which is engaged by head 68 thereof in previously mentioned bearing collar 70.

Replacement of the shimming wedge 54 is believed to be apparent, since removal of the plates 78 and 82 will permit ready withdrawal of the wedge. Transverse adjustment of the wedge surface 60 will result in moving the element 50 and adjusting the brake lining toward the inner surface of the drum or rotor 14. It will be noted that the polygonal nut 68 is in a readily accessible position inside the wheel assembly. Further, if uneven wear should occur on the independently operated brake shoes, the shoe-to-drum clearances of the independent shoes will be accurately and readily adjusted in a simple and effective manner.

It will be noted that the element 50 engages centrally of the insert of the shoe 17 with maximum force being concentrated thereat.

Obviously, many modifications may be made without departing from the basic spirit of the present invention, and therefore, within the scope of the appended claims, the invention may be practiced other than has been specifically described.

I claim:

1. An elongated brake shoe for use in a brake drum, said brake shoe having an outer braking surface along one side for engaging a corresponding surface of a drum, the improvement comprising a housing extending transversely of one end of the brake shoe and integral therewith, said housing being formed at one end of the shoe on the inner surface opposite said braking surface and including an integral bearing sleeve communicating with the interior of said housing and opening away from said braking surface for reciprocably receiving a force transmitting element therein, a shimming wedge reciprocably disposed within said housing and having an inclined cam edge portion exposed beneath said bearing sleeve and inclined with respect to said bearing sleeve, and adjusting means connected between said housing and said wedge for adjustably positioning said cam edge with respect to the bearing sleeve.

2. An elongated brake shoe as claimed in claim 1 in which said housing includes a transverse through passage having an irregular cross section, said wedge having a cross section complementary to said housing passage, an end closure plate removably mounted on at least one end of said housing, said closure plate including a lateral bearing sleeve at one side thereof, said adjusting means comprising a bolt threadedly connected to said wedge and projecting through said lateral bearing sleeve and including a terminal head abutingly engaged with said lateral bearing sleeve.

3. An elongated brake shoe as claimed in claim 1 in which said shimming wedge means comprises an elongated base having a polygonal integral plate, said plate extending substantially the length of said base, said cam edge extending angularly with respect to said base and having a groove extending into the surface thereof for receiving the terminal end of a force transmitting element therein.

4. A brake assembly including a brake drum having an inner surface, at least one brake shoe displacably supported in said drum and having a braking surface normally disengageable and engageable with the inner surface of said drum, a bell crank element mounted in said drum, a force-transmitting link operatively connected to said bell crank element for operating said brake shoe to brake said drum, said brake shoe including an integral housing extending transversely of said shoe and including a bearing sleeve opening away from braking surface and receiving said force-transmitting link therein, said housing including a transverse passage, shimming wedge means adjustably mounted for transverse movement in said transverse passage and including an inclined cam edge exposed beneath said bearing sleeve, said force transmitting element including a terminal end portion engaged on said cam edge whereby adjusting said shimming wedge means determining the brake shoe-to-drum clearance and permitting compensation for brake-lining wear.

References Cited by the Examiner

UNITED STATES PATENTS

| 1,685,450 | 9/1928 | Fornaca | 188—79.5 |
| 1,838,188 | 12/1931 | Morgan | 188—79.5 X |
| 1,844,496 | 2/1932 | Blume | 188—79.5 |
| 1,947,905 | 2/1934 | Evans | 188—79.5 X |
| 2,115,551 | 4/1938 | Farmer | 188—79.5 X |

DUANE A. REGER, *Examiner.*